US010777897B2

(12) United States Patent
Choon et al.

(10) Patent No.: US 10,777,897 B2
(45) Date of Patent: Sep. 15, 2020

(54) ANTENNA SYSTEM AND COMMUNICATION TERMINAL

(71) Applicant: AAC Technologies Pte. Ltd., Singapore (SG)

(72) Inventors: Tan Yew Choon, Singapore (SG); Ng Guan Hong, Singapore (SG); Tay Yew Siow, Singapore (SG)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/296,493

(22) Filed: Mar. 8, 2019

(65) Prior Publication Data

US 2020/0194898 A1 Jun. 18, 2020

(30) Foreign Application Priority Data

Dec. 12, 2018 (CN) .......................... 2018 1 1514001

(51) Int. Cl.
*H01Q 1/38* (2006.01)
*H01Q 21/22* (2006.01)
(Continued)

(52) U.S. Cl.
CPC .............. *H01Q 9/0457* (2013.01); *H01Q 1/38* (2013.01); *H01Q 21/22* (2013.01); *H04W 88/02* (2013.01)

(58) Field of Classification Search
CPC .......... H01Q 1/38; H01Q 21/06; H01Q 21/22; H01Q 1/50; H01Q 1/48; H01Q 1/24; H01Q 1/22; H01Q 9/0457; H04W 88/02
See application file for complete search history.

(56) References Cited

U.S. PATENT DOCUMENTS 6,127,985 A * 10/2000 Guler .................... H01Q 13/10
343/770
8,188,932 B2 * 5/2012 Worl .................. H01Q 21/0075
343/776
(Continued)

FOREIGN PATENT DOCUMENTS

CN 105470661 A1 4/2016
CN 106887722 A1 6/2017
CN 109066065 A * 12/2018

OTHER PUBLICATIONS

1st Office Action dated Feb. 28, 2020 by SIPO in related Chinese Patent Application No. 201811514001.2(6 Pages).
(Continued)

*Primary Examiner* — Khawar Iqbal
(74) *Attorney, Agent, or Firm* — IPro, PLLC; Na Xu

(57) ABSTRACT

The invention provides an antenna system, includes a system ground unit and a dual polarized millimeter wave antenna unit. The dual polarization millimeter wave antenna unit includes a first substrate layer, a second substrate layer and a third substrate layer, a ground layer attached to a side of the first substrate layer away from the second substrate layer and electrically connected to the system ground unit, a feeder sandwiched between the first substrate layer and the second substrate layer and a radiator fixed on one side of the third substrate layer away from the second substrate layer. The feeder is provided with a horizontally polarized feed port and a vertically polarized feed port. The feeder is coupled to the radiator. Compared with the relevant technology, the communication signal of the antenna system is strong and stable.

9 Claims, 9 Drawing Sheets

(51) Int. Cl.
  *H01Q 9/04*  (2006.01)
  *H04W 88/02* (2009.01)

(56) References Cited

U.S. PATENT DOCUMENTS

| | | | | |
|---|---|---|---|---|
| 9,184,482 B2* | 11/2015 | Runyon | .................... | H01P 5/12 |
| 10,559,891 B2* | 2/2020 | Biancotto | ............ | H01Q 21/245 |
| 2010/0231475 A1* | 9/2010 | Ou | ....................... | H01Q 3/0258 |
| | | | | 343/776 |
| 2011/0050534 A1* | 3/2011 | Shimayama | ............ | H01P 5/028 |
| | | | | 343/850 |
| 2015/0194730 A1* | 7/2015 | Sudo | ..................... | H01Q 5/378 |
| | | | | 343/905 |
| 2017/0222863 A1* | 8/2017 | Franca-Neto | ........ | H01Q 1/2258 |
| 2017/0294705 A1* | 10/2017 | Khripkov | ............... | H01Q 21/24 |
| 2018/0309198 A1* | 10/2018 | Yu | .......................... | H01Q 1/243 |
| 2019/0237879 A1* | 8/2019 | Park | ..................... | H02J 50/005 |
| 2019/0379121 A1* | 12/2019 | Choon | .................... | H01Q 1/38 |
| 2020/0161766 A1* | 5/2020 | Liu | ...................... | H01Q 9/0414 |

OTHER PUBLICATIONS

PCT search report dated Jan. 2, 2020 by SIPO in related PCT Patent Application No. PCT/CN2019/109413 (4 Pages).

PCT written opinions dated Jan. 2, 2020 by SIPO in related PCT Patent Application No. PCT/CN2019/109413 (5 Pages).

* cited by examiner

ANTENNA SYSTEM AND COMMUNICATION TERMINAL

FIELD OF THE PRESENT DISCLOSURE

The invention involves one kind of antenna, especially one kind of antenna system and communication terminal applied in the field of communication electronic product.

DESCRIPTION OF RELATED ART

With the development of mobile communication technology, mobile phones, PAD and notebook computers have gradually become indispensable electronic products in life and this kind of electronic products have been updated to electronic communication products equipped with antenna systems to enable them to have communication functions.

5G is the focus of research and development in the industry all over the world. Its three main application highlights are: enhanced mobile broadband, large—scale machine communication, high reliability and low delay communication. Three application highlights correspond respectively to different key indicators, wherein the user peak speed in the enhanced mobile bandwidth is 20 Gbps and the minimum user experience speed is 100 Mbps. The unique characteristics of millimeter wave, i.e. high carrier frequency and large bandwidth are the main aspects to realize 5G ultra-high data transmission speed. Therefore, the rich bandwidth resources in millimeter wave band provide guarantee for high-speed transmission.

However, due to the intense space loss of electromagnetic waves in this frequency band of millimeter wave, wireless communication antenna system using millimeter wave band needs phased array architecture. The phase of each array element is distributed according to a certain rule through a phase shifter, so as to form a high gain wave beam, and the beam is scanned in a certain spatial range by changing the phase shift. But if line-of-sight communication cannot be maintained between the transmitter and receiver of the antenna system in millimeter wave band, the communication link is easily broken. If the bandwidth of the frequency band covered in the beam range is limited, the reliability of the antenna system will be affected.

Therefore, it is necessary to provide a new antenna system and communication terminal to solve the problems above.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
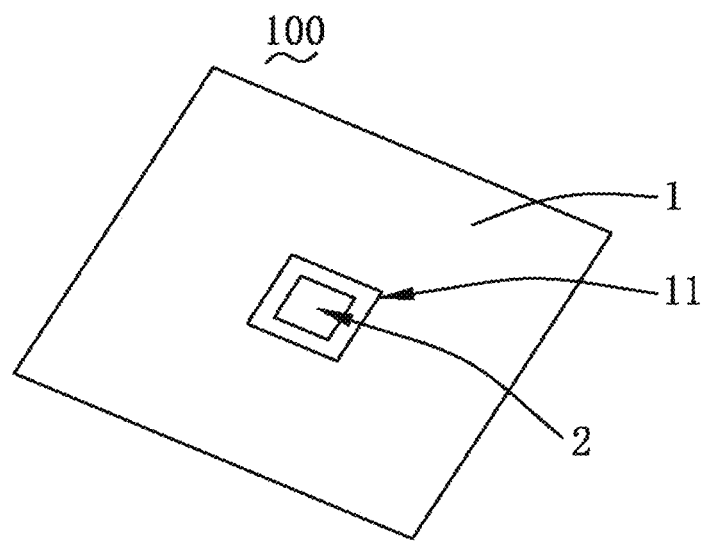
FIG. 1 is the structural diagram of an antenna system according to the present invention.

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

By referring to FIGS. 1-4, the invention provides an antenna system 100, which includes a system ground unit 1 and a dual polarized millimeter wave antenna unit 2.

The system ground unit 1 includes a receiving hole 11 extended thoroughly. The dual polarized millimeter wave antenna unit 2 is embedded and fixed in the receiving hole 11.

Specifically, the dual polarization millimeter wave antenna unit 2 comprises a first substrate layer 21, a second substrate layer 22, a third substrate layer 23, a ground layer 24, a feeder 25 and a radiator 26.

The second substrate layer 22 is stacked on the first substrate layer 21. The third substrate layer 23 is stacked on the second substrate layer 22 and is located on the side of the second substrate layer 22 away from the first substrate layer 21. That is, the first substrate layer 21, the second substrate layer 22, and the third substrate layer 23 are vertically stacked in this order to form a stacked structure.

In this embodiment, the first substrate layer 21 and the third substrate 23 are made of the same material. The second substrate layer 22 and the third substrate layer 23 are respectively in a direction perpendicular to the first substrate layer 21, completely matched with the first substrate layer 21 toward the normal projection of the first substrate layer 21.

The ground layer 24 is attached to the side of the first substrate layer 21 away from the second substrate layer 22 and is electrically connected to the system ground unit 1.

The feeder 25 is sandwiched between the first substrate layer 21 and the second substrate layer 22. The feeder 25 is provided with horizontally polarized feed port 251 and vertically polarized feed port 252 which are spaced apart from each other. The structure of the above-mentioned feeder 25 forms a dual polarization structure. In this embodiment, the horizontally polarized feed port 251 and the vertically polarized feed port 252 are connected through probes to a feed network or an external power source after passing through the first substrate layer 21. Preferably, the horizontally polarized feed port 251 and the vertically polarized feed port 252 are located at a non-geometric center of the feeder 25, for example the edge of the feeder 25 etc.

In this embodiment, the feeder 25 is a capacitive feeding patch. Specifically, the feeder 25 is fixed to the first substrate layer 21. Preferably, the feeder 25 is formed by etching on the surface of the first substrate layer 21.

The radiator 26 is fixed to the side of the third substrate layer 23 away from the second substrate layer 22. The feeder 25 is coupled to the radiator 26, so that the energy of the feeder 25 is coupled to the radiator 26, thereby forming dual polarized radiation of the radiator 26, and operating in the millimeter wave band 28 GHz.

In other words, the radiator 26 is not connected to the ground layer 24. The radiator 26 is also not directly electrically connected to the feeder 25, only coupled with the feeder 25.

In this embodiment, the radiator 26 is a patch, preferably, the radiator 26 is formed by etching on the third substrate layer 23.

Figure 5:
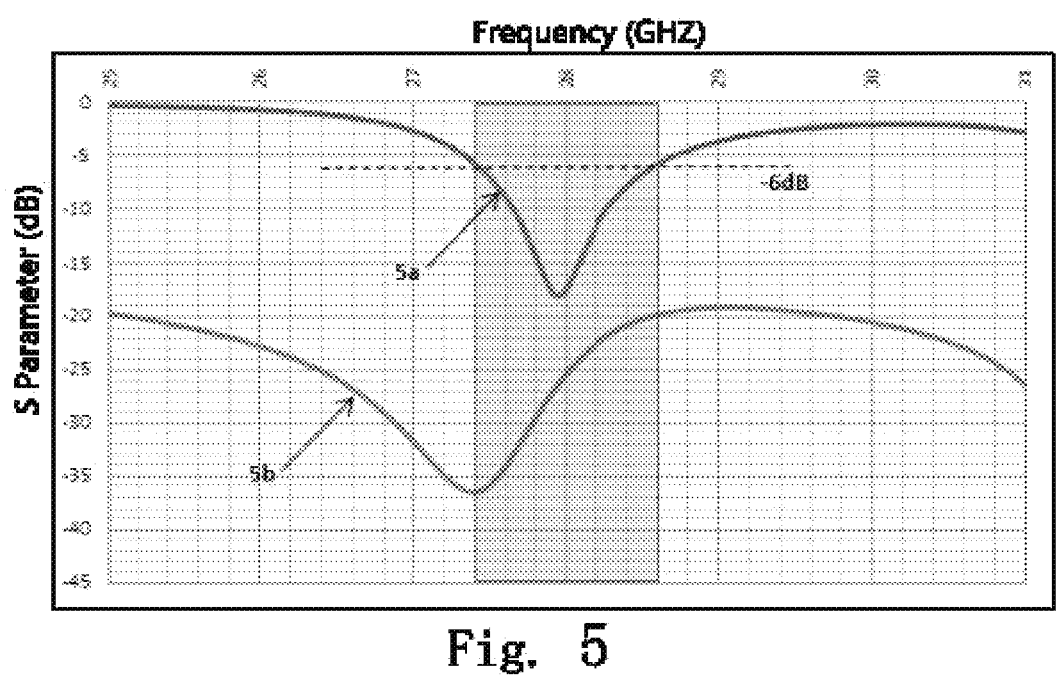
FIG. 5 is S parameter characteristics curve of a dual polarized millimeter wave antenna element of the antenna system of FIG. 1.

By referring to FIGS. 5-7 also, FIG. 5 is S parameter characteristics curve of a dual polarized millimeter wave antenna element of the antenna system of FIG. 1.

Curve 5a in FIG. 5 is a reflection coefficient curve of the horizontally polarized feed port and the vertically polarized feed port of the dual polarized millimeter wave antenna element. As it can be seen from curve 5a, the reflection coefficient curves of the horizontally polarized feed port and the vertically polarized feed port are consistent. As it can be seen from the reflection coefficient curve, the antenna system 100 resonates at about 28 GHz, the reflection coefficient in 27.4 GHz-28.6 GHz band is less than −6 dB, the absolute bandwidth is 1.2 GHz.

Curve 5b in FIG. 5 is an isolation curve between the horizontally polarized feed port and the vertically polarized feed port of the dual polarized millimeter wave antenna element. As it can be seen from curve 5b, in 25 GHz-31 GHz band, the isolation between two feed ports is less than −15 dB.

Figure 6A:
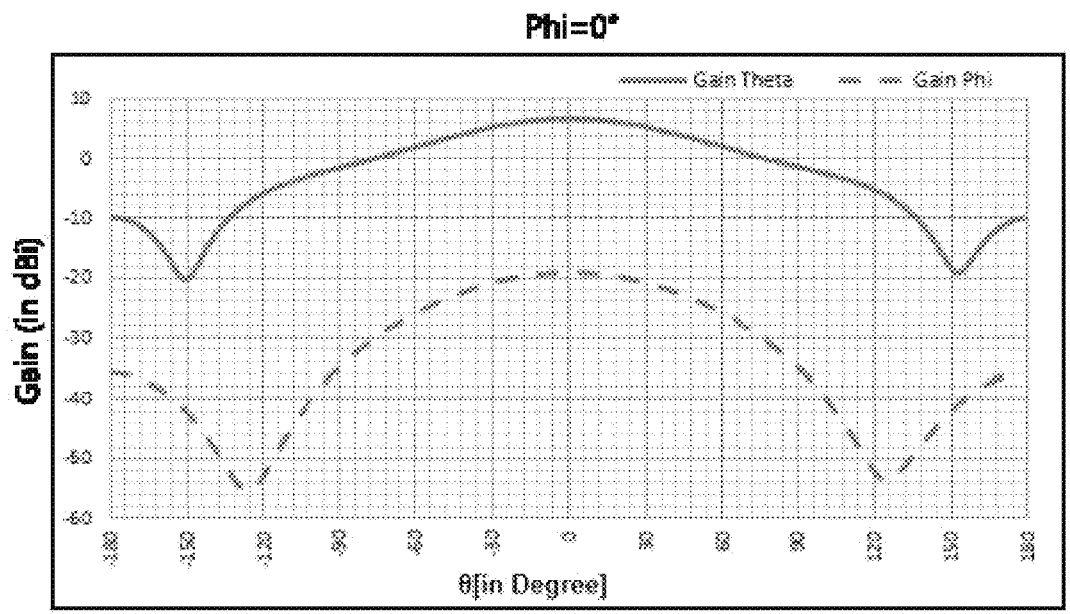
FIG. 6a and FIG. 6b are the gain curve of horizontal polarization of the antenna system of FIG. 1 at 28 GHz.
Figure 6B:
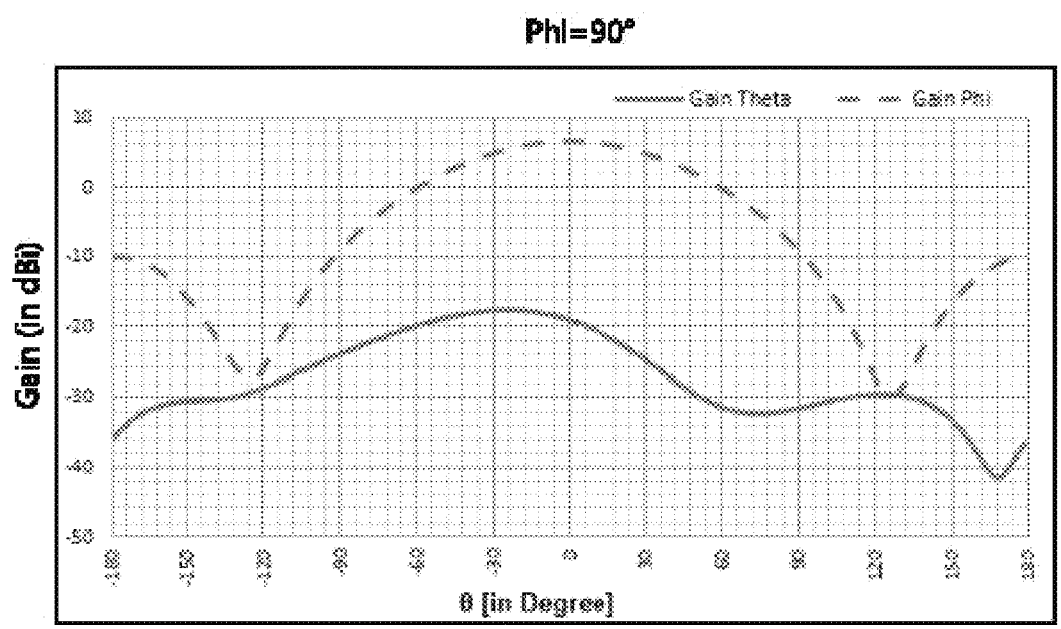

FIG. 6a and FIG. 6b are the gain curve of horizontal polarization of the antenna system of FIG. 1 at 28 GHz. In horizontal polarization mode, the horizontally polarized feed port 251 is in feeding state (ON), the vertically polarized feed port 252 is in matching state (OFF).

Figure 2:
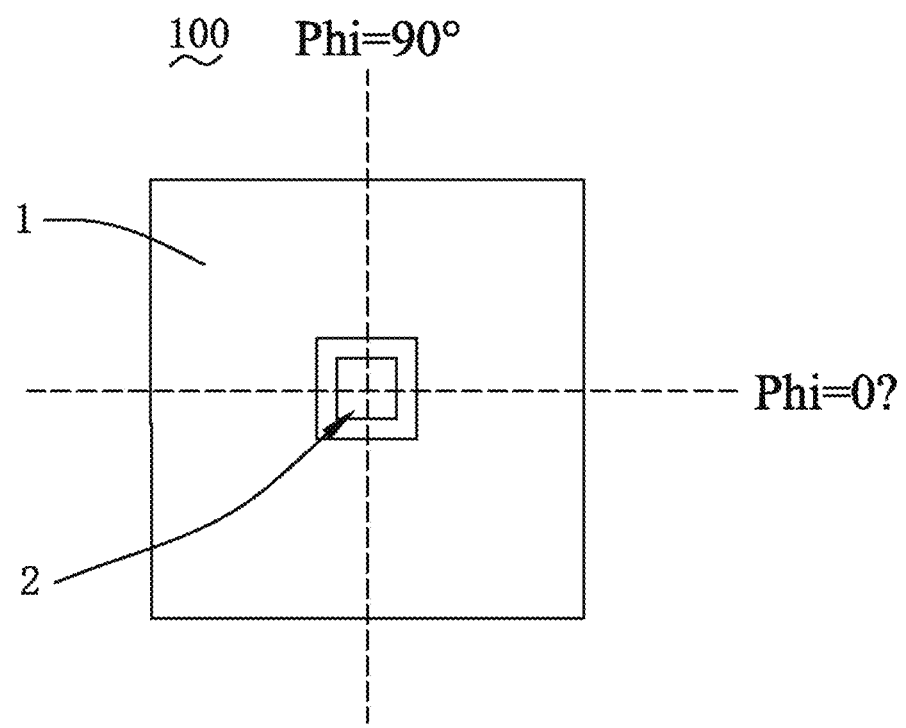
FIG. 2 is the top view of FIG. 1.
Figure 3:
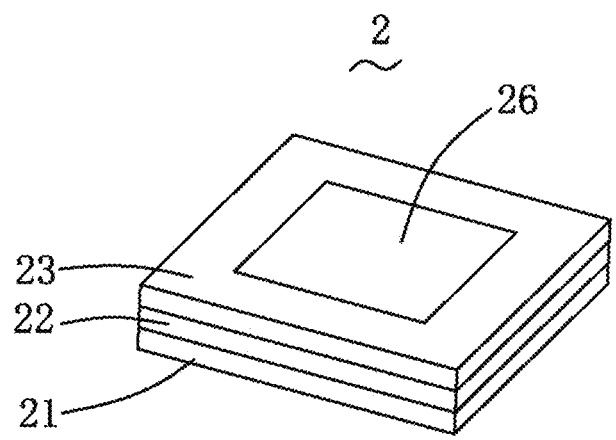
FIG. 3 is a three-dimensional structure diagram of a dual polarized millimeter wave antenna unit of the antenna system of the present invention.
Figure 4:
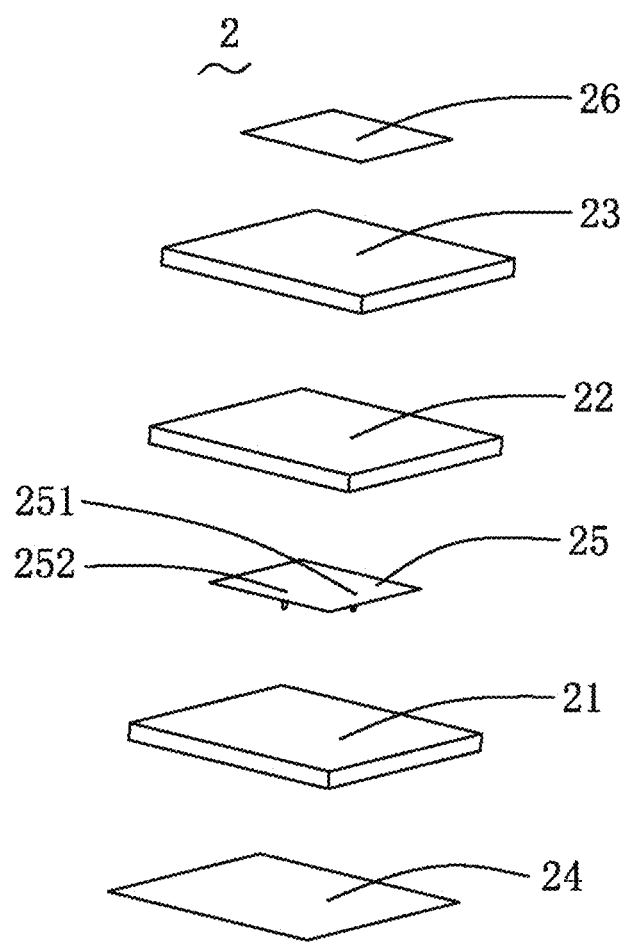
FIG. 4 is a three-dimensional structure break-down diagram of a dual polarized millimeter wave antenna unit of the antenna system of the present invention.

Referring to FIG. 2, the plane with Phi=0° in FIG. 2 is a horizontal plane and the plane with Phi=90° is a vertical plane. The horizontal plane is the viewing plane passing through the horizontally polarized feed port and the vertical plane is the viewing plane passing through the vertically polarized feed port.

FIG. 6a is a gain curve in the plane correspond to Phi=0° in FIG. 2, i.e. the gain curve of the dual polarized millimeter wave antenna unit 2 at 28 GHz in the horizontal plane, in which, the solid line is Theta (θ) component of the gain and the dotted line is Phi component of the gain. It is observed that Theta component is mainly polarized, Phi component is crossly polarized, in which, the maximum gain of the main polarization is 6.7 dBi and the gain value of cross polarization is lower than −19 dBi.

FIG. 6b is a gain curve in the plane with Phi=90° in FIG. 2, i.e. the gain curve of the dual polarized millimeter wave antenna unit 2 at 28 GHz in the vertical plane, in which, the solid line is Theta component of the gain and the dotted line is Phi component of the gain. It is observed that Phi component is mainly polarized and Theta component is crossly polarized, in which, the maximum gain of the main polarization is 6.7 dBi and the gain value of cross polarization is lower than −16 dBi.

Figure 7A:
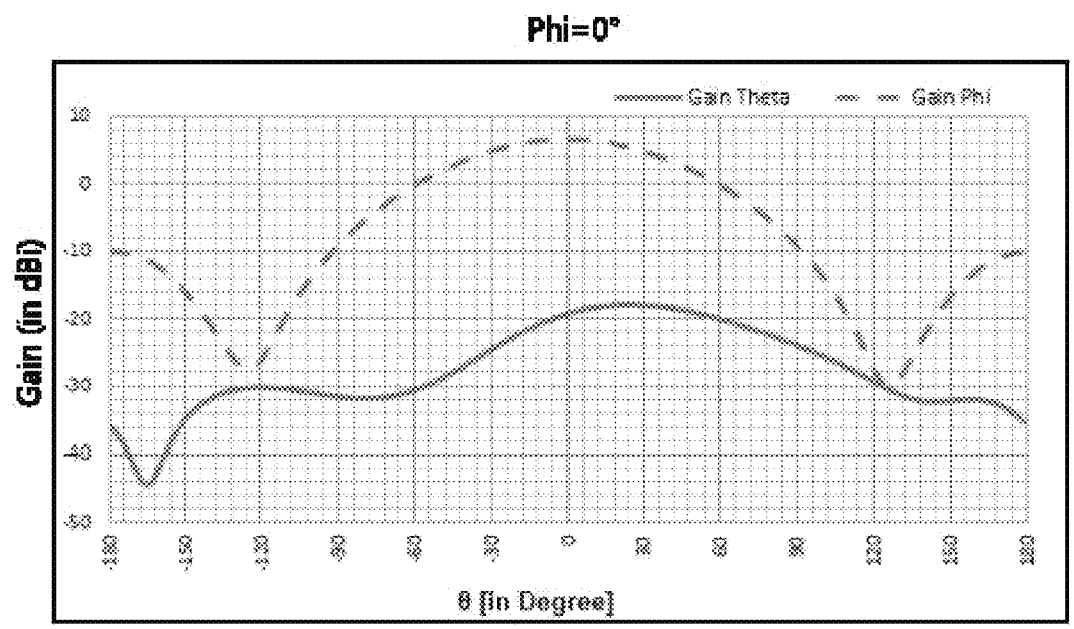
FIG. 7a and FIG. 7b are the gain curve of vertical polarization of the antenna system of FIG. 1 at 28 GHz.
Figure 7B:
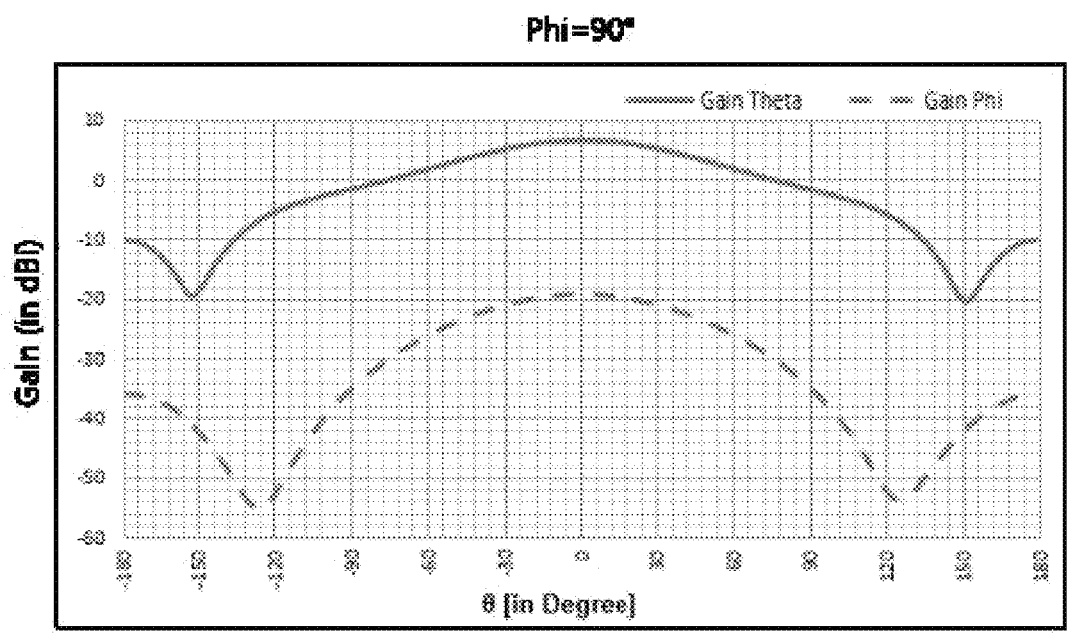

FIG. 7a and FIG. 7b are the gain curve of vertical polarization of the antenna system of FIG. 1 at 28 GHz. In vertical polarization mode, the vertically polarized feed port 252 is in feeding state (ON) and the horizontally polarized feed port 251 is in matching state (OFF).

FIG. 7a is a gain curve in the plane with Phi=0° in FIG. 2, i.e. the gain curve of the dual polarized millimeter wave antenna unit 2 at 28 GHz in the horizontal plane, in which, the solid line is Theta component of the gain and the dotted line is Phi component of the gain. It is observed that Phi component is mainly polarized and Theta component is crossly polarized, in which, the maximum gain of the main polarization is 6.7 dBi and the gain value of cross polarization is lower than −16 dBi.

FIG. 7b is a gain curve in the plane with Phi=90° in FIG. 2, i.e. the gain curve of the dual polarized millimeter wave antenna unit 2 at 28 GHz in the vertical plane, in which, the solid line is Theta component of the gain and the dotted line is Phi component of the gain. It is observed that Theta component is mainly polarized and Phi component is crossly polarized, in which, the maximum gain of the main polarization is 6.7 dBi and the gain value of cross polarization is lower than −19 dBi.

As it can be seen from FIGS. 6-7, the gain characteristic of horizontal polarization in the vertical plane is as same as the gain characteristic of vertical polarization in the horizontal plane. Similarly, the gain characteristics of horizontal polarization in the horizontal plane are as same as the gain characteristics of vertical polarization in the vertical plane.

The above structure is an antenna system structure formed by a single dual polarized millimeter wave antenna unit 2, while the antenna system 100 of the present invention may include different embodiments formed by different numbers of dual polarized millimeter wave antenna elements 2, that is, the receiving holes 11 of the system ground unit 1 include N holes and the dual-polarized millimeter wave antenna unit 2 includes N units which are respectively embedded and fixed in N receiving holes 11. N dual polarized millimeter wave antenna elements 2 are distributed in a matrix to form a phased array antenna system structure.

Figure 8:
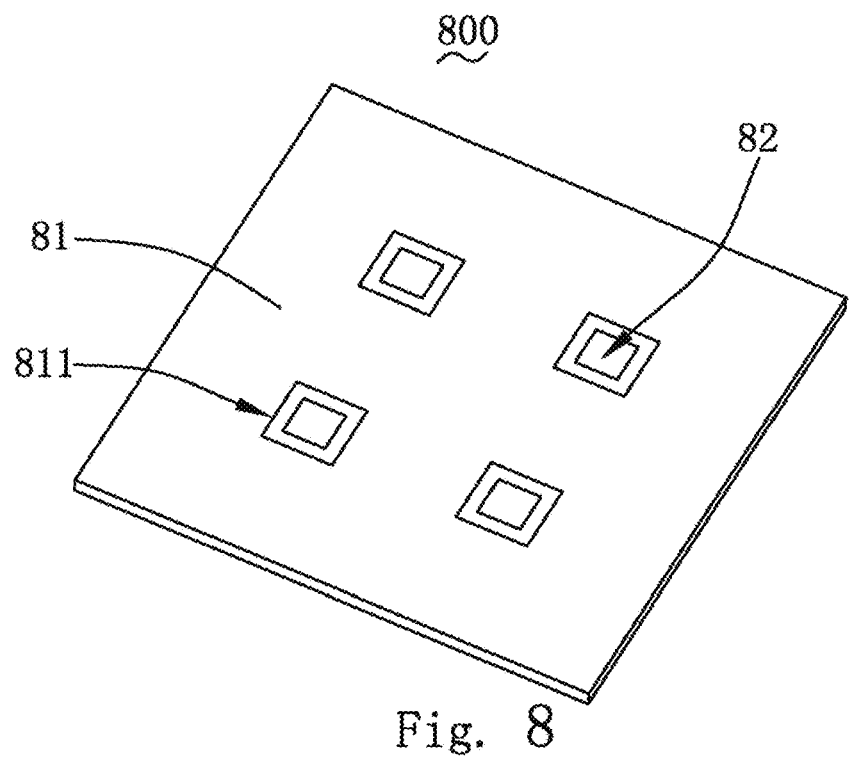
FIG. 8 is a three-dimensional structure diagram of one embodiment of the antenna system of the present invention.
Figure 9:
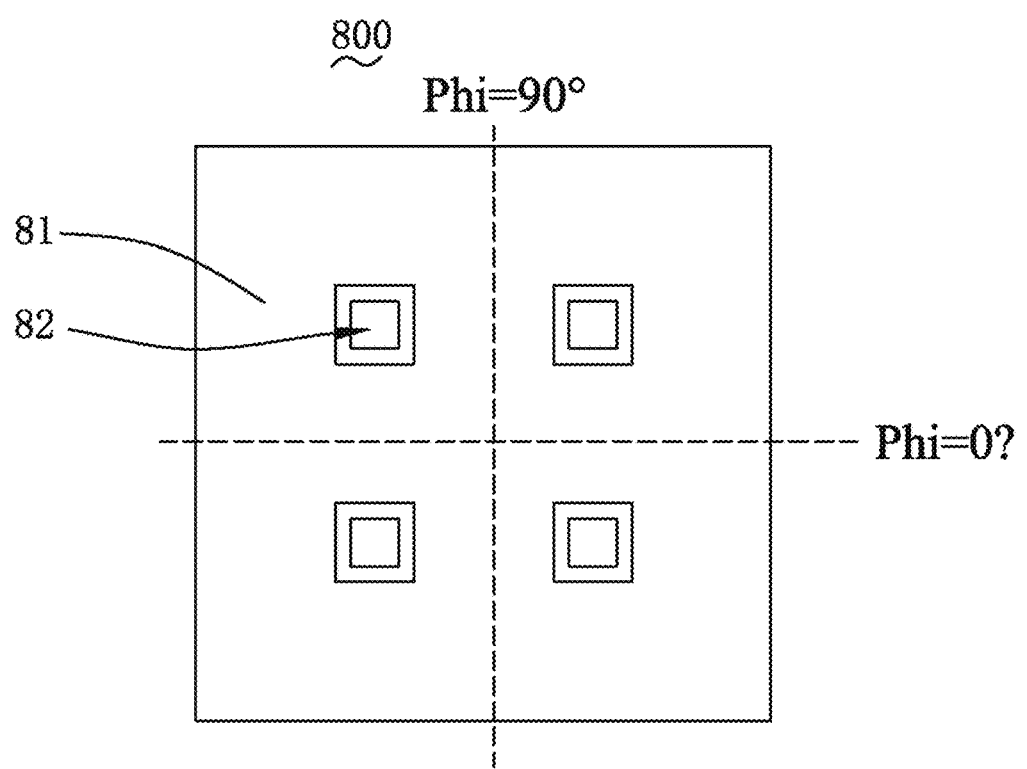
FIG. 9 is the top view of the antenna system of FIG. 8.

The dual polarized millimeter wave antenna unit comprises 4 units in 2*2 matrix distribution, forming another embodiment of the present invention as shown in FIGS. 8-9.

In this embodiment, the antenna system 800 includes 4 dual polarized millimeter wave antenna elements 82. The system ground unit 81 is provided with 4 receiving holes 811. 4 dual polarization millimeter wave antenna units 82 are respectively embedded in 4 receiving holes 811, i.e. a phased array antenna system structure with 2*2 matrix distribution is formed. Compared with the antenna system structure formed by a single dual polarized millimeter wave antenna unit, its beam coverage is wider and communication reliability is higher. It should be noted that the dual-polarized millimeter wave antenna unit 82 in this embodiment has the same structure as the dual-polarized millimeter wave antenna unit 2 in the above embodiment. This is not repeated here.

By referring to FIGS. 10-13, FIG. 10a and FIG. 10b are a gain curve of horizontal polarization of the antenna system of FIG. 8 at 28 GHz. In horizontal polarization mode, the horizontally polarized feed port is in feeding state (ON) and the vertically polarized feed port is in matching state (OFF). The plane with Phi=0° in FIG. 9 is a horizontal plane and the plane with Phi=90° is a vertical plane. The horizontal plane is the viewing plane passing through the horizontally polarized feed port and the vertical plane is the viewing plane passing through the vertically polarized feed port.

Figure 10A:
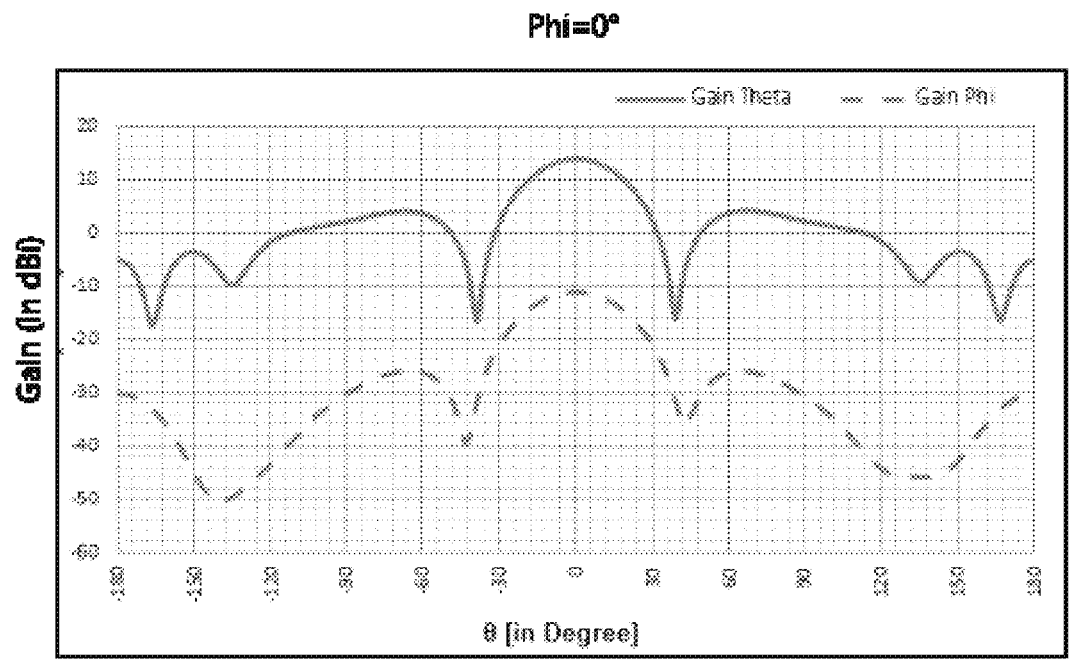
FIG. 10a and FIG. 10b are the gain curve of horizontal polarization of the antenna system of FIG. 8 at 28 GHz.

In which, FIG. 10a is a gain curve in the plane with Phi=0° in FIG. 9, i.e. the gain curve of the dual polarized millimeter wave antenna unit 82 at 28 GHz in the horizontal plane, in which, the solid line is Theta component of the gain and the dotted line is Phi component of the gain. It is observed that Theta component is mainly polarized and Phi component is crossly polarized, in which, the maximum gain of the main polarization is 14 dBi and the gain value of cross polarization is lower than −10 dBi.

Figure 10B:
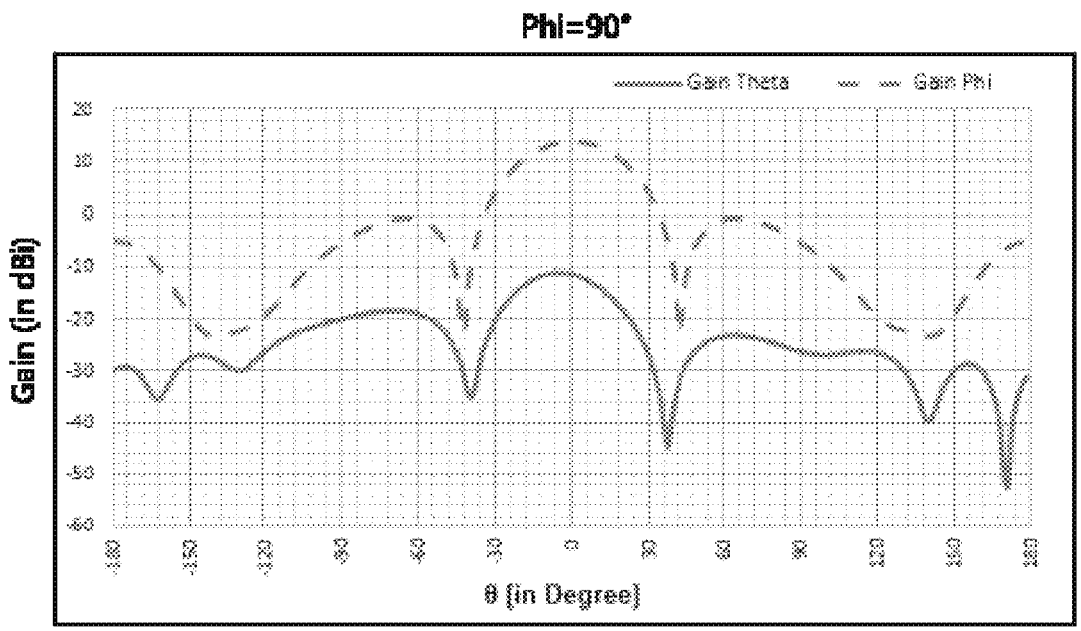

FIG. 10b is a gain curve in the plane with Phi=90° in FIG. 9, i.e. the gain curve of the dual polarized millimeter wave antenna unit 82 at 28 GHz in the vertical plane, in which, the solid line is Theta component of the gain and the dotted line is Phi component of the gain. It is observed that Phi component is mainly polarized and Theta component is crossly polarized, in which, the maximum gain of the main polarization is 14 dBi and the gain value of cross polarization is lower than −10 dBi.

Figure 11A:
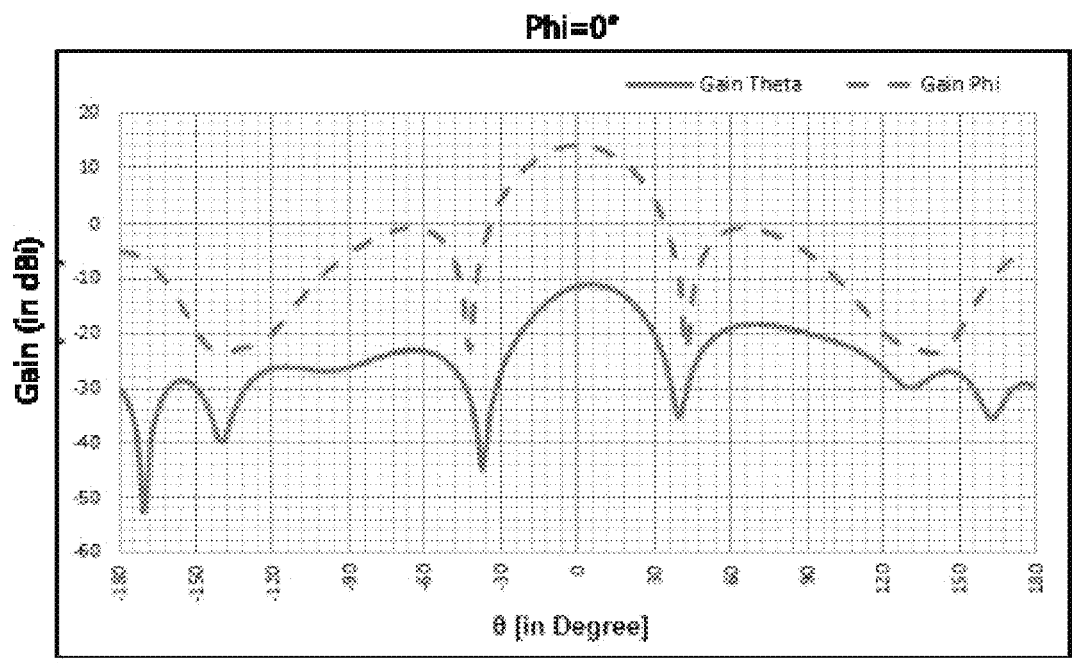
FIG. 11a and FIG. 11b are the gain curve of vertical polarization of the antenna system of FIG. 8 at 28 GHz.
Figure 11B:
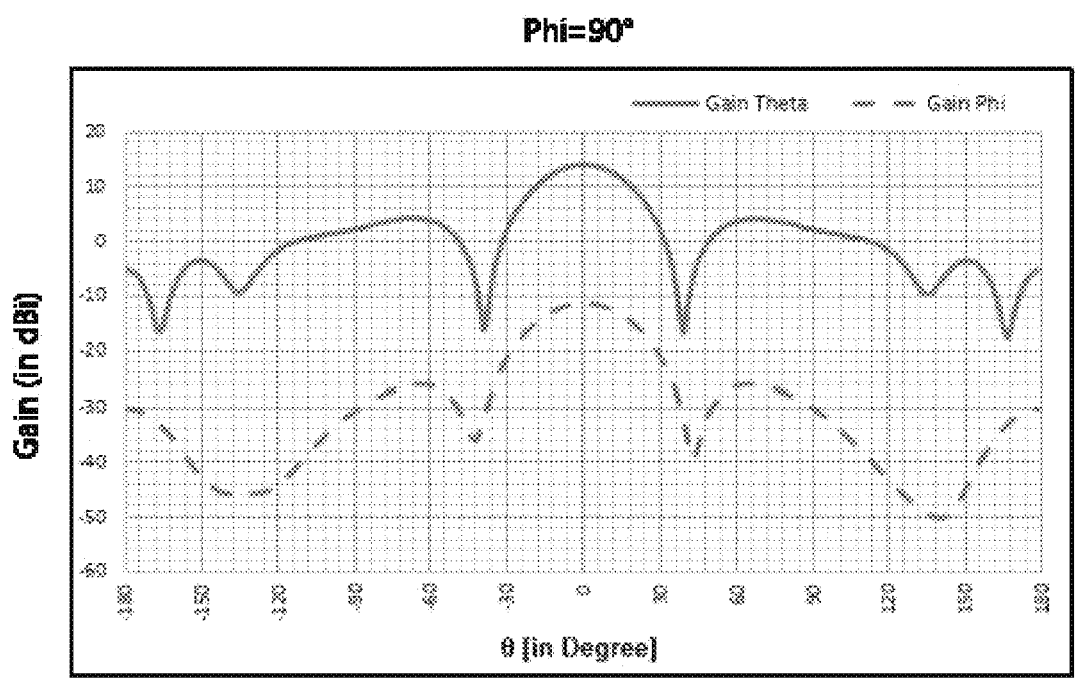

FIG. 11a and FIG. 11b are a gain curve of vertical polarization of the antenna system of FIG. 8 at 28 GHz. In vertical polarization mode, the vertically polarized feed port is in feeding state (ON) and the horizontally polarized feed port is in matching state (OFF).

FIG. 11a is a gain curve in the plane correspond with Phi=0° in FIG. 9, i.e. the gain curve of the dual polarized millimeter wave antenna unit 82 at 28 GHz in the horizontal plane, in which, the solid line is Theta component of the gain and the dotted line is Phi component of the gain. It is observed that Phi component is mainly polarized and Theta component is crossly polarized, in which, the maximum gain of the main polarization is 14 dBi and the gain value of cross polarization is lower than −10 dBi.

FIG. 11b is a gain curve in the plane with Phi=90° in FIG. 9, i.e. the gain curve of the dual polarized millimeter wave antenna unit 82 at 28 GHz in the vertical plane, in which, the solid line is Theta component of the gain and the dotted line is Phi component of the gain. It is observed that Theta component is mainly polarized and Phi component is crossly polarized, in which, the maximum gain of the main polarization is 14 dBi and the gain value of cross polarization is lower than −10 dBi.

Figure 12:
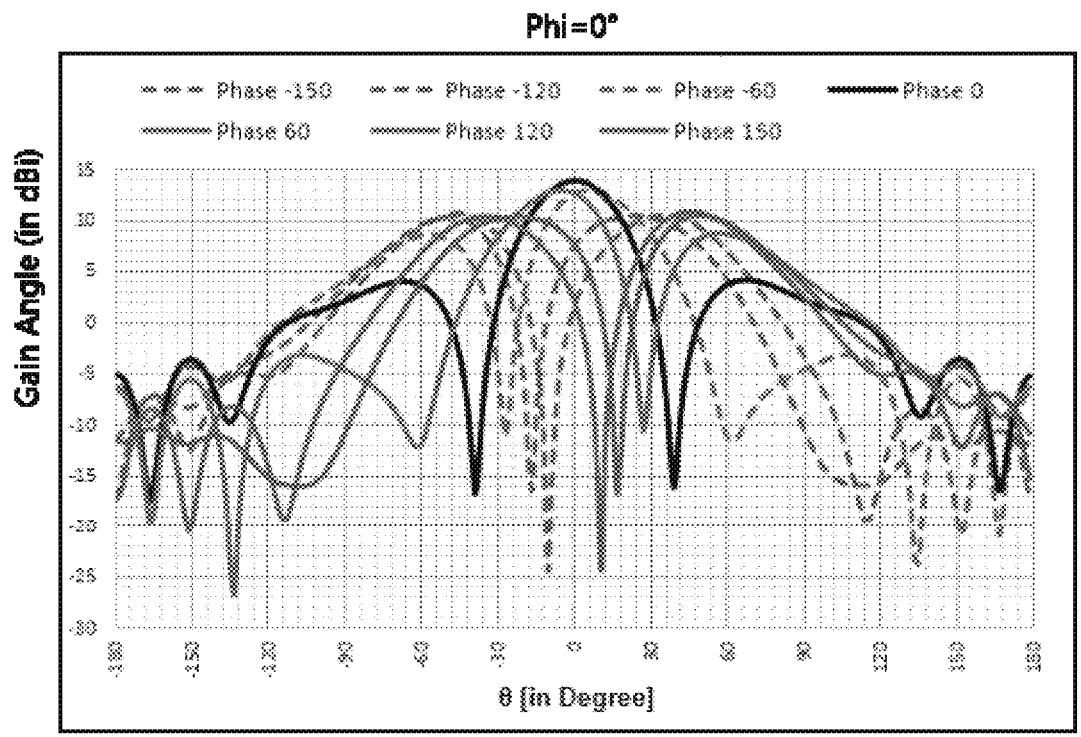
FIG. 12 shows the gain curve of antenna system of FIG. 8 in 28 GHz, horizontal plane, horizontal polarization mode when the main beam points to different θ angles.

FIG. 12 shows the gain curve of antenna system of FIG. 8 in 28 GHz, horizontal plane, horizontal polarization mode when the main beam points to different θ angles, in which, each curve shows the beam scanning direction when the phase shift between dual polarized millimeter wave antenna elements is −150°, −120°, −60°, 0°, 60°, 120° and 150° respectively.

As it can be seen from FIG. 12, in the scanning range from θ=−45° to θ=45°, the gain of the main beam can reach 10 dBi, in which, as it is known from FIG. 10a, in horizontal polarization mode and in the horizontal plane, Theta component of the gain is the main polarization.

Figure 13:
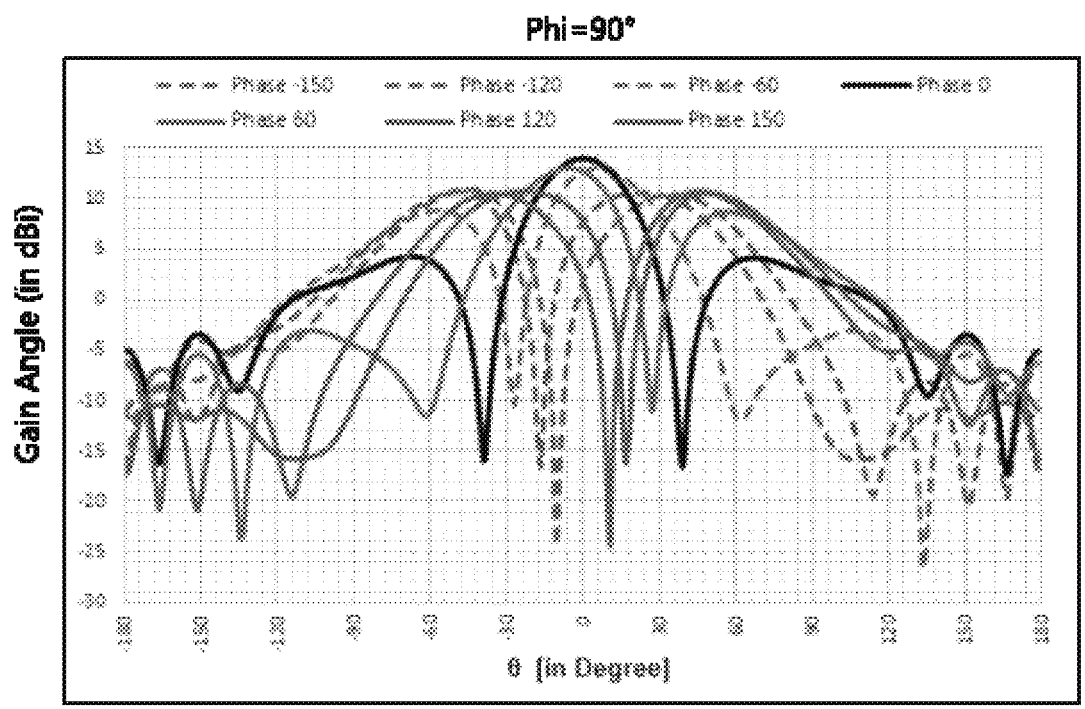
FIG. 13 shows the gain curve of antenna system of FIG. 8 in 28 GHz, vertical plane, vertical polarization mode when the main beam points to different θ angles.

FIG. 13 shows the gain curve of antenna system of FIG. 8 in 28 GHz, vertical plane, vertical polarization mode when the main beam points to different θ angles, in which, each curve shows the beam scanning direction when the phase shift between dual polarized millimeter wave antenna elements is −150°, −120°, −60°, 0°, 60°, 120° and 150° respectively.

As it can be seen from FIG. 13, in the scanning range from θ=−45° to θ=45°, the gain of the main beam can reach 10 dBi, in which, as it is known from FIG. 11a, in vertical polarization mode and in the vertical plane, Theta component of the gain is the main polarization.

It should be noted that the number of the dual polarized millimeter wave antenna elements is not limited to 1, 4, 16, etc. in the antenna system of the present invention. The matrix distribution may also be formed by other numbers. The different embodiments mentioned above only differ in the number of the dual polarized millimeter wave antenna elements, and is not limited to 4 matrix distributions. It is also possible to form a phased array antenna system of a larger size to achieve the desired total gain of the antenna system.

The invention also provides a communication terminal, which comprises the antenna system provided by the invention.

Compared with the relevant technology, in the antenna system and the communication terminal of the present invention, the antenna system is designed as one or more dual polarized millimeter wave antenna elements, so as to form a high gain wave beam, and the beam is scanned in a larger spatial range by changing the phase shift, so as to maintain uninterrupted line-of-sight communication between the transmitter and the receiver of the antenna system, so that the communication signal of the communication terminal of the antenna system is strong and stable, has good reliability and wider frequency band.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An antenna system, including:
   a system ground unit having a receiving hole extending thoroughly;
   a dual polarized millimeter wave antenna unit embedded and fixed in the receiving hole; the dual polarized millimeter wave antenna unit including:
   a first substrate layer;
   a second substrate layer stacked on the first substrate layer;
   a third substrate layer stacked on the second substrate layer and located on a side of the second substrate layer away from the first substrate layer;
   a ground layer attached to a side of the first substrate layer away from the second substrate layer and electrically connected with the system ground unit;
   a feeder sandwiched between the first substrate layer and the second substrate layer, the feeder being provided with a horizontally polarized feed port and a vertically polarized feed port located at a non-geometric center of the feeder and spaced apart from each other; and
   a radiator fixed to a side of the third substrate layer away from the second substrate layer and coupled to the feeder, the radiator is a patch.

2. The antenna system as described in claim 1, wherein the feeder is a capacitive feeding patch.

3. The antenna system as described in claim 2, wherein the feeder is fixed to the first substrate layer.

4. The antenna system as described in claim 3, wherein the feeder is formed by etching on the surface of the first substrate layer.

5. The antenna system as described in claim 1, wherein the radiator is formed by etching on the third substrate layer.

6. The antenna system as described in claim 1, wherein the first substrate layer and the third substrate are made of same material; the second substrate layer and the third substrate layer are respectively in a direction perpendicular to the first substrate layer, completely matched with the first substrate layer toward a normal projection of the first substrate layer.

7. The antenna system as described in claim 1, wherein the receiving hole includes a plurality of holes and the dual polarized millimeter wave antenna unit include a plurality of units for forming a phased array antenna system.

8. The antenna system as described in claim 7, wherein the dual polarized millimeter wave antenna unit comprises 4 units in a 2*2 matrix distribution.

9. A communication terminal including an antenna system as described in claim 1.

\* \* \* \* \*